June 21, 1927.
H. G. DURNELL
1,633,520
ROLLER BOX
Filed June 18, 1926
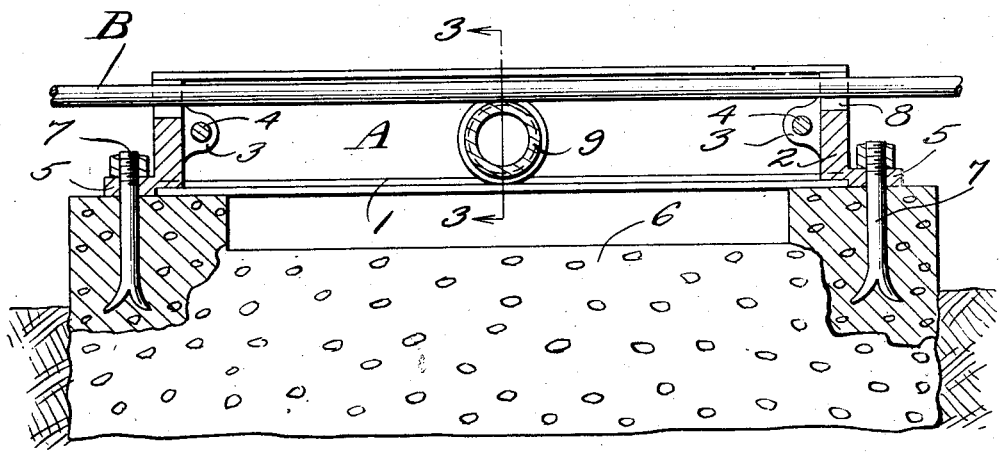
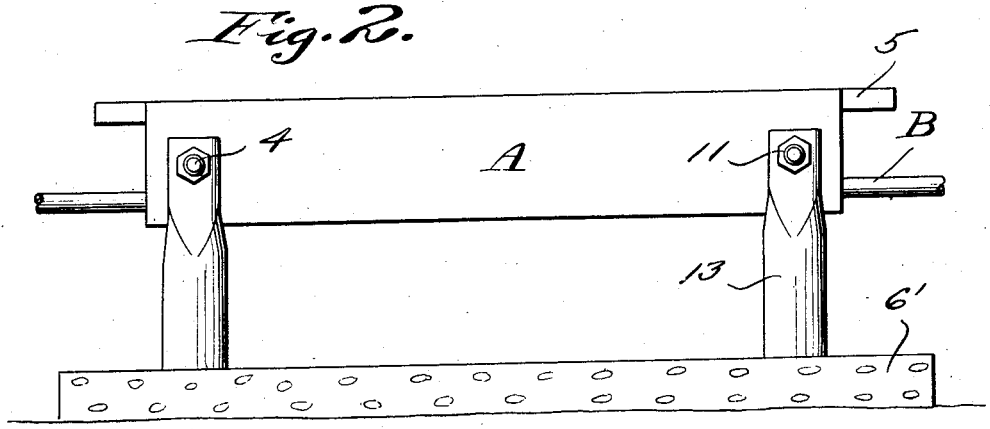
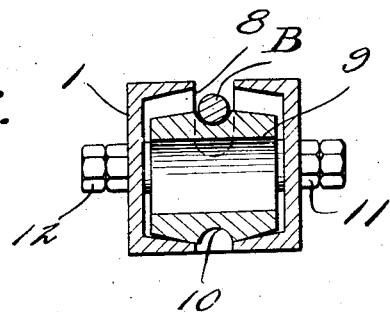
H. G. Durnell
INVENTOR
BY Victor J. Evans
ATTORNEY
WITNESS:

Patented June 21, 1927.

1,633,520

UNITED STATES PATENT OFFICE.

HAROLD G. DURNELL, OF BARTLESVILLE, OKLAHOMA.

ROLLER BOX.

Application filed June 18, 1926. Serial No. 116,999.

This invention relates to means for supporting the rod lines that are used to communicate motion from a central power plant to the well jacks of oil wells and the like, the general object of the invention being to provide roller devices for supporting the rods wherever desired, each device comprising a casing or box and a roller movably mounted therein and grooved to receive a part of the line.

Another object of the invention is to provide the box with an opening in its bottom so that dirt or other foreign matter cannot accumulate in the box to interfere with the movement of the roller.

A further object of the invention is to so form the device that it can be used to either hold up a rod line or to prevent the line from rising.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal sectional view through a device showing the same in use as holding up a rod line.

Figure 2 is an elevation, but showing the device used to hold a rod from moving upwardly.

Figure 3 is a section on line 3—3 of Figure 1.

As shown in these views, I provide a casing A which is preferably formed of two pieces 1 of channel iron set on edge and held together by the end pieces 2 which have inwardly extending ears 3 thereon through which the bolts 4 pass, which hold the parts assembled. The end pieces are so made as to hold the channel irons in spaced relation, as shown in Figure 3. Each end piece is provided with an outwardly extending perforated part 5 so that the box can be fastened to a base 6, as shown in Figure 1, by the lug screws 7.

From the foregoing, it will be seen that the spaced channel irons form longitudinally extending slots in the bottom and top of the box and the end pieces are notched, as at 8, the walls of the notches registering with the edges of the channel irons. A hollow roller 9 is loosely mounted in the box and said roller tapers from the center toward each end. Its center is provided with an annular groove 10 for receiving the rod line B. The bolts 4 have each end threaded and each end of each bolt receives a nut 11 and a nut 12, the nuts 11 holding the parts of the box in assembled position while the nuts 12 act as lock nuts for the nuts 11 or these nuts can be used for holding legs 13 to the box, as shown in Figure 2.

It will thus be seen that the roller 9 will support a rod line, such as B, and will permit it to move under the strokes of the power machinery with but little friction. By making the roller tapered, it will conform to the bottom of the box formed by the guideways and by making this bottom as shown, dirt and other foreign material will slide down the sloping portions and pass through the lower slot and thus not interfere with the action of the roller. The device can be used for supporting a rod line where the line passes over a hill or it can be used at any other desired place to support a rod line such as on the down hill side of the power house and it can also be used, as in Figure 2, to hold the rod down on the up hill side of the power house or other places. In this case, the box is inverted and the legs 13 bolted to the same and fastened to a suitable base, such as 6'.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A roller box of the class described comprising an elongated box having a slot in its top and a slot in its bottom with the bottom sloping downwardly toward the slot and a roller movably mounted in the box and adapted to support a rod line, said roller being tapered to conform to the sloping bottom.

2. A roller box of the class described formed of two channel irons set on edge and spaced apart and a pair of end pieces fastened to the ends of the channel irons, a roller in the box tapering from its center toward each end and having an annular groove at its center for receiving a rod line.

3. A roller box of the class described formed of two channel irons set on edge and spaced apart and a pair of end pieces fastened to the ends of the channel irons, a roller in the box tapering from its center toward each end and having an annular groove at its center for receiving a rod line, means for attaching legs to the box to hold it in inverted position off the ground and means for fastening the box to a base.

4. A roller box formed of a pair of channel irons set on edge and spaced apart and a pair of end pieces, bolts passing through the irons and portions of the end pieces, each bolt having a pair of nuts on each end thereof, the outer nuts serving as lock nuts or for holding legs on the bolts, a roller movably arranged in the box and beveled from its center toward each end with an annular groove at its center.

In testimony whereof I affix my signature.

HAROLD G. DURNELL.